(12) United States Patent
Müller

(10) Patent No.: US 7,634,962 B2
(45) Date of Patent: Dec. 22, 2009

(54) DIAPHRAGM FOR A DIAPHRAGM VALVE

(75) Inventor: Fritz Müller, Ingelfingen (DE)

(73) Assignee: GEMÜ Gerbrüder Müller Apparatebau GmbH & Co. KG, Ingelfingen (DE)

( * ) Notice: Subject to any disclaimer, the term of this patent is extended or adjusted under 35 U.S.C. 154(b) by 126 days.

(21) Appl. No.: 11/337,312

(22) Filed: Jan. 23, 2006

(65) Prior Publication Data

US 2006/0162547 A1    Jul. 27, 2006

(30) Foreign Application Priority Data

Jan. 26, 2005  (DE)  ............... 20 2005 001 250 U

(51) Int. Cl.
*F01B 19/02*  (2006.01)
*F16J 3/02*   (2006.01)

(52) U.S. Cl. .......................................... 92/99; 92/103 F

(58) Field of Classification Search .................. 92/99, 92/103 F, 98 R
See application file for complete search history.

(56) References Cited

U.S. PATENT DOCUMENTS

| 1,473,173 | A | * | 11/1923 | Brinkerhoff | .................... 92/99 |
| 2,710,629 | A | * | 6/1955 | Price | ........................ 92/103 F |
| 2,724,398 | A | * | 11/1955 | Higgins et al. | ................. 92/99 |
| 4,208,031 | A | * | 6/1980 | Jonak | ........................ 92/103 F |
| 4,327,891 | A | * | 5/1982 | Allen et al. | ................. 92/103 F |
| 4,881,876 | A | * | 11/1989 | Laziou | ........................ 92/98 R |

* cited by examiner

*Primary Examiner*—F. Daniel Lopez
(74) *Attorney, Agent, or Firm*—Henry M. Feiereisen; Ursula B. Day

(57) ABSTRACT

A diaphragm for a diaphragm valve in particular for liquid fluids includes a backing membrane and a primary membrane which are supported by a central connection pin. Disposed axially between the backing membrane and the primary membrane is a reinforcing element.

4 Claims, 3 Drawing Sheets

DIAPHRAGM FOR A DIAPHRAGM VALVE

CROSS-REFERENCES TO RELATED APPLICATIONS

This application claims the priority of German Patent Application, Serial No. 20 2005 001 250.5, filed Jan. 26, 2005, pursuant to 35 U.S.C. 119(a)-(d), the content of which is incorporated herein by reference.

BACKGROUND OF THE INVENTION

The present invention relates to a diaphragm for a diaphragm valve, especially for use with liquid fluids.

It would be desirable and advantageous to provide an improved diaphragm which obviates prior art shortcomings and is of superior stability.

SUMMARY OF THE INVENTION

According to one aspect of the present invention, a diaphragm for a diaphragm valve in particular for liquid fluids includes a backing membrane, a primary membrane, a central connection pin for supporting the backing and primary membranes, and a reinforcing element disposed axially between the backing membrane and the primary membrane.

According to another feature of the present invention, the reinforcing element may be made of metal, e.g. steel.

According to another feature of the present invention, the reinforcing element may be formed on a radial inward side with a bead for engagement in a groove of the backing membrane. On the radial outer side, the reinforcing element may be formed with an axial collar in surrounding relationship to an outer side of the backing membrane.

According to another feature of the present invention, the backing membrane may be made of two portions. Currently preferred is a construction in which the backing membrane includes an inner membrane member, which is connected to the connecting pin, and an outer membrane member. The outer membrane member may hereby be placed loosely onto the connecting pin or may be fixedly secured to the connecting pin.

According to another feature of the present invention, the outer membrane member and the reinforcing element may jointly be vulcanized.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
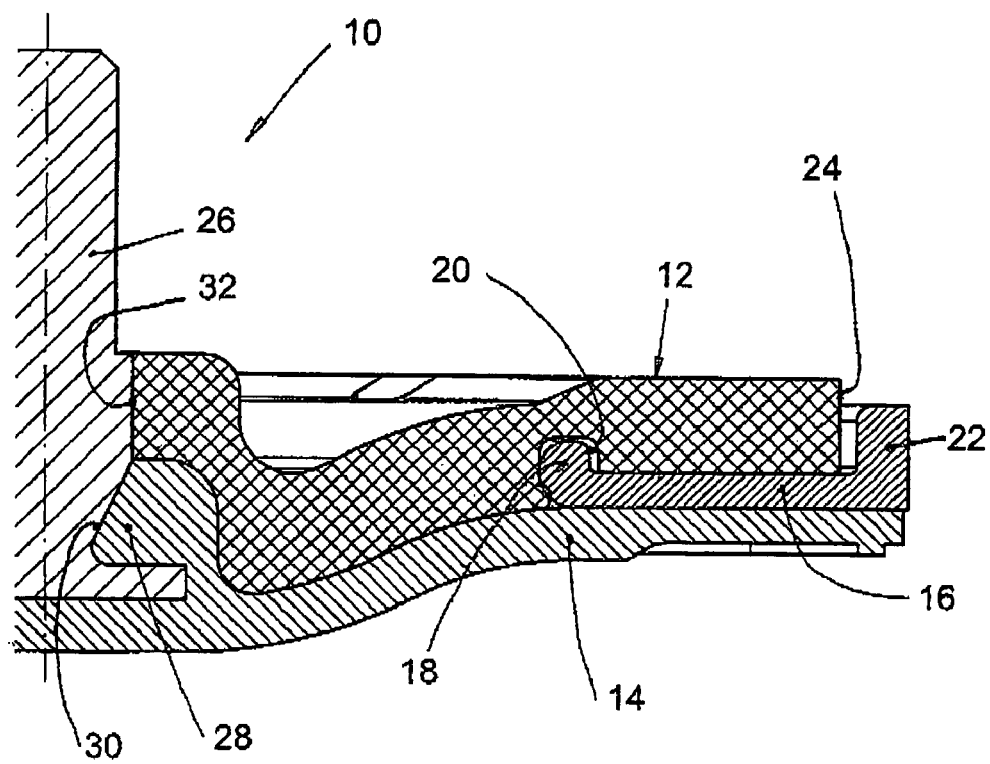
FIG. 1 is a sectional view, on an enlarged scale, of one embodiment of a diaphragm according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a sectional view, on an enlarged scale, of one embodiment of a diaphragm according to the present invention, generally designated by reference numeral 10. The diaphragm 10 includes a backing membrane 12 made of elastomer and a primary membrane made of PTFE (polytetrafluoroethylene) and constituting the actual diaphragm seal. Disposed axially between the backing membrane 12 and the primary membrane 14 is a reinforcing element 16 which is made of metal, e.g. steel. The reinforcing element 16 is constructed in the form of a plate which has a radial inner end provided with an axially projecting bead 18, and a radial outer end provided with an axially projecting collar 22. The bead 18 engages a respective groove 20 in the backing membrane 12, whereas the axial collar 22 is placed in surrounding relationship to the outer side 24 of the backing membrane 12.

When assembling the diaphragm 10, the backing membrane 12 is clamped onto the reinforcing element 16, with the bead 18 engaging the groove 20 of the backing membrane 12, as shown in FIG. 1.

The primary membrane 14 has an inside area formed with a ring-shaped nose 28 which is received in a respective annular groove 30 of a connecting pin 26 to thereby establish a form-fitting connection between the primary membrane 14 and the connecting pin 26. Both the primary membrane 14 and the connecting pin 26 are then pushed from below through an inner central bore 32 of the backing membrane 12 until the primary membrane 14 bears upon the backing membrane 12. This is also shown in FIG. 1. The bead 18 may extend in parallel relationship to the collar 22 of the reinforcing element 16 or may be of circular or arcuate configuration.

Figure 2:
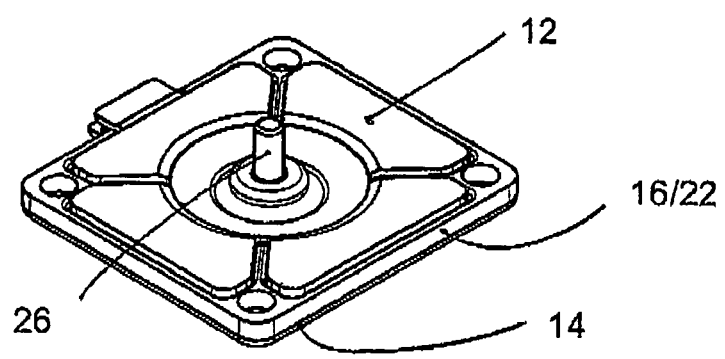
FIG. 2 is a top and side perspective view of the diaphragm of FIG. 1.

The diaphragm 10, which is shown by way of perspective view in its natural size in FIG. 2 and has a configuration resembling a four-leaf clover, ensures a fluid tightness to the outside as the entire compressive force is concentrated on the sealing surface. The tightness in the valve is realized via the primary membrane 14 of PTFE.

Figure 3:
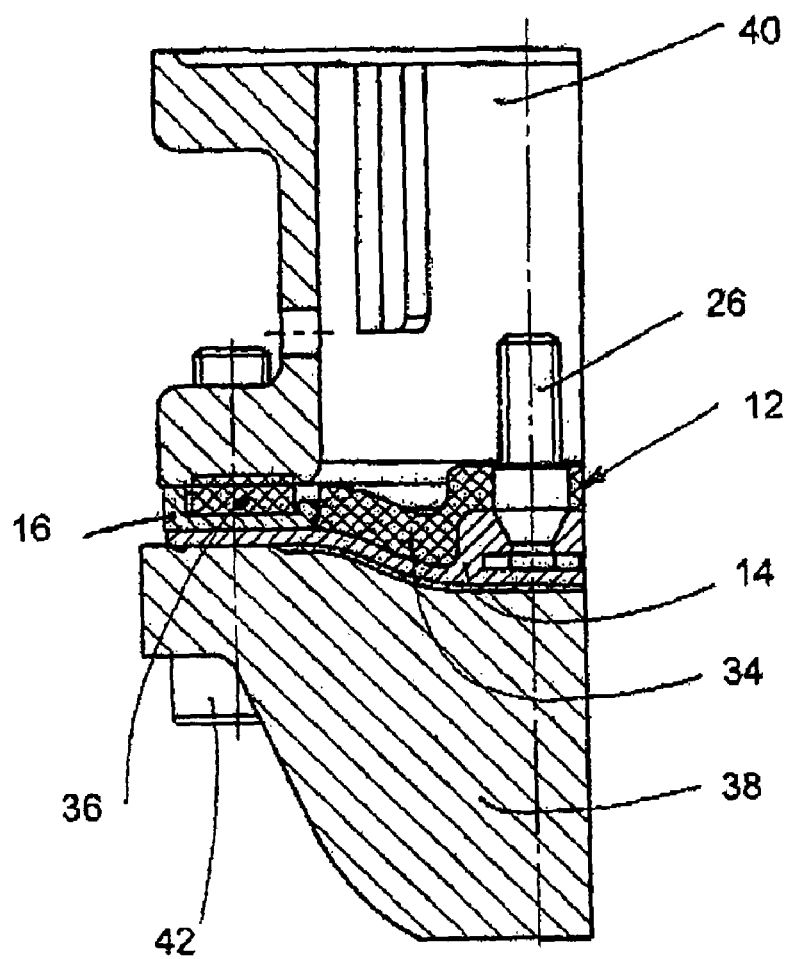
FIG. 3 is a sectional view of another embodiment of a diaphragm according to the present invention, installed in a valve body.

Referring now to FIG. 3, there is shown a sectional view of another embodiment of a diaphragm according to the present invention, shown here installed in a valve body 38. Parts corresponding with those in FIG. 1 are denoted by identical reference numerals and not explained again. The description below will center on the differences between the embodiments. In this embodiment, the backing membrane 12 is made of two portions, namely an inner membrane member 34 and a separate outer membrane member 36. The connecting pin 26 is configured in a same manner as shown in FIG. 1 and is connected in form-fitting manner with the primary membrane 14, with the inner membrane member 34 of the backing membrane 12 being placed on the primary membrane 14, as shown in FIG. 3. The outer membrane member 36 can be placed loosely from atop in the reinforcing element 16, or may be fixedly secured to the reinforcing element 13 through vulcanization.

Figure 4:
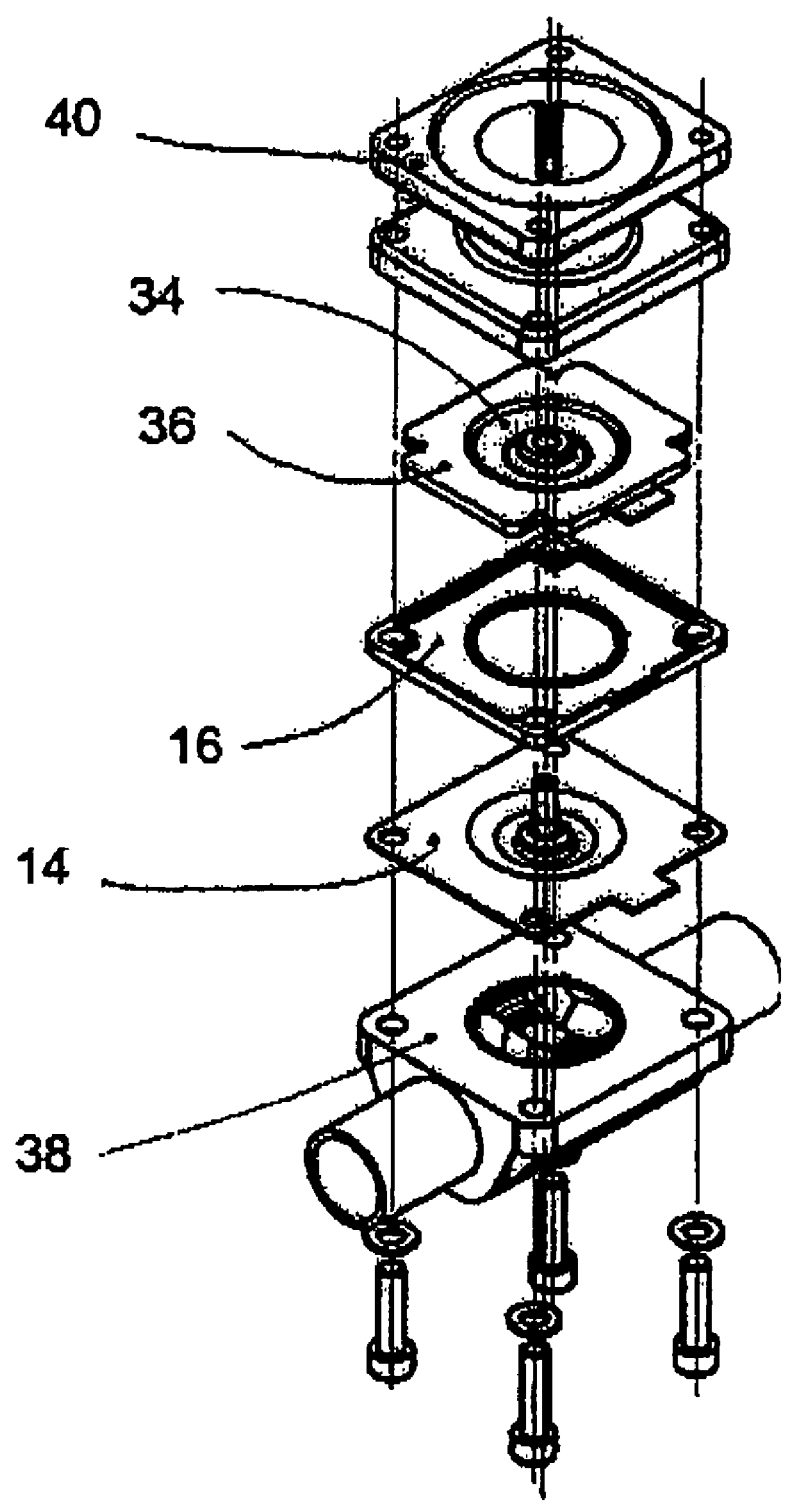
FIG. 4 is an exploded illustration of the diaphragm of FIG. 3 in combination with the valve body.

The diaphragm of FIG. 3 is shown here partly installed in a valve which is comprised of the valve body 38 and an intermediate piece 40, with the diaphragm being clamped between the intermediate piece 40 and the valve body 38 and secured by screw fasteners 42. An exploded view of the diaphragm in combination with the valve is also shown in FIG. 4.

The outer membrane member 36 seals the valve to the outside. The inner membrane member 34 represents the moving part for forcing the primary membrane 14 against the sealing surface of the valve body so as to ensure the tightness via the sealing surface in the valve. Thus, if replacement becomes necessary, there is only need for exchanging the inner membrane member 34 as the outer membrane member 36 is loaded only statically and forms only the flange sealing on the valve body 38.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A diaphragm for a diaphragm valve in particular for liquid fluids, comprising:

a backing membrane;

a primary membrane separate from the backing membrane;

a central connection pin for supporting the backing and primary membranes; and a reinforcing element disposed axially between the backing membrane and the primary membrane, said reinforcing element having opposite axial ends, with one of the ends configured to engage in the backing membrane and another one of the ends configured to surround an outer edge of the backing membrane, wherein the backing membrane includes an inner membrane member connected to the connecting pin, and an outer membrane member separate from the inner membrane, and wherein the outer membrane member and the reinforcing element are jointly vulcanized.

2. The diaphragm of claim 1, wherein the reinforcing element is made of metal.

3. The diaphragm of claim 1, wherein the reinforcing element is made of steel.

4. The diaphragm of claim 1, wherein the other end of the reinforcing element includes an axial collar in surrounding relationship to the outer edge of the backing membrane.

* * * * *